United States Patent
Duan et al.

(10) Patent No.: US 10,213,937 B2
(45) Date of Patent: Feb. 26, 2019

(54) FENCE SYSTEM FOR A BAND SAW

(71) Applicant: Rikon Power Tools, Inc., Billerica, MA (US)

(72) Inventors: Wuzheng Duan, Qingdao Shandong (CN); Jiquan Jiang, Qingdao Shandong (CN)

(73) Assignee: Rikon Power Tools, Inc., Billerica, MA (US)

( * ) Notice: Subject to any disclaimer, the term of this patent is extended or adjusted under 35 U.S.C. 154(b) by 437 days.

(21) Appl. No.: 14/716,612

(22) Filed: May 19, 2015

(65) Prior Publication Data

US 2016/0207217 A1 Jul. 21, 2016

(30) Foreign Application Priority Data

Jan. 15, 2015 (CN) .......................... 2015 1 0019965
Jan. 15, 2015 (CN) ...................... 2015 2 0027342 U

(51) Int. Cl.
*B27B 27/08* (2006.01)
*B27B 27/10* (2006.01)
*B27B 13/16* (2006.01)
*B23D 55/04* (2006.01)

(52) U.S. Cl.
CPC .............. *B27B 27/08* (2013.01); *B23D 55/04* (2013.01); *B27B 13/16* (2013.01); *B27B 27/10* (2013.01)

(58) Field of Classification Search
CPC ......... B27B 27/08; B27B 27/10; B27B 13/16; B27B 27/00; B27B 27/02; B27B 27/04; B27B 27/06; B23D 55/04; B27C 5/04; B27C 5/06; Y10T 83/5815; Y10T 83/5824; Y10T 83/7593; Y10T 83/7607; Y10T 83/7613; Y10T 83/7647; Y10T 83/773; Y10T 83/707
See application file for complete search history.

(56) References Cited

U.S. PATENT DOCUMENTS

| | | | |
|---|---|---|---|
| 5,979,283 A * | 11/1999 | Osborne | B27B 25/10 33/459 |
| 6,601,493 B1 | 8/2003 | Crofutt | |
| 7,930,960 B2 * | 4/2011 | Duginske | B23Q 3/007 144/253.1 |
| 2005/0172765 A1* | 8/2005 | Moore | B23D 53/06 83/13 |
| 2006/0266183 A1* | 11/2006 | Guo | B23D 51/10 83/471.3 |
| 2010/0269657 A1* | 10/2010 | Koegel | B27B 5/243 83/444 |

OTHER PUBLICATIONS

DriftMaster Bandsaw Fence System Manual (Copyright 2010).
Taunton's Complete Illustrated Guide to Bandsaws, Section 1: The Versatile Bandsaw (Copyright 2012).

* cited by examiner

*Primary Examiner* — David Bryant
*Assistant Examiner* — Nirvana Deonauth
(74) *Attorney, Agent, or Firm* — Wolf, Greenfield & Sacks, P.C.

(57) ABSTRACT

Adjustable fence systems and their methods of use are described. A fence adjustment system includes a drift angle adjustment mechanism configured to adjust the angle of a fence to correct for blade drift.

21 Claims, 4 Drawing Sheets

FENCE SYSTEM FOR A BAND SAW

RELATED APPLICATIONS

This application claims foreign priority benefits under 35 U.S.C. § 119(a)-(d) or 35 U.S.C. § 365(b) of Chinese Application No. 201520027342.2, filed Jan. 15, 2015, and Chinese Application No. 201510019965.X, filed Jan. 15, 2015.

FIELD

Disclosed embodiments are related to fence systems for band saws.

BACKGROUND

Band saws typically include a table to support a work piece and a fence disposed on the table to guide and/or align the work piece to allow an operator to make straight line cuts. A fence is typically positioned parallel to the direction of a cut to achieve a straight line cut; however, band saw blades may "drift" such that the actual cutting direction is offset at an angle from the desired cutting direction. Drift is typically corrected or accounted for by adjusting the angle of the fence relative to the blade. The specific drift angle may depend on a number of factors such as the specific material and/or geometry of the blade, the blade tension, and the type of material being cut. Therefore, when the blade on a band saw is changed or adjusted, or a different material is being cut, the angle of the fence is also typically adjusted to correct for the new drift angle.

SUMMARY

In one embodiment, a fence adjustment system includes a housing and a drift adjustment mechanism coupled to the housing and configured to displace a portion of a fence away from the housing. The fence is attached to the housing such that displacement of the portion of the fence by the drift adjustment mechanism causes the fence to rotate about a fulcrum. A lock is movable between a locked configuration and an unlocked configuration. The lock limits displacement of the fence relative to the housing when the lock is in a locked configuration. A biasing element is arranged to cause the fence to maintain contact with the housing when the lock is in an unlocked configuration.

In another embodiment, a fence adjustment system includes a housing having a fulcrum, with the housing configured to engage a first portion of a fence at the fulcrum. A cam is configured to displace a second portion of the fence. Displacement of the second portion of the fence by the cam causes the fence to rotate about the fulcrum. A lock is movable between a locked configuration and an unlocked configuration. The lock limits displacement of the fence when the lock is in a locked configuration. In a direction from an infeed side of the fence to the outfeed side of the fence, the fulcrum is positioned on the housing followed by the lock positioned in the housing, followed by the cam positioned in the housing.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
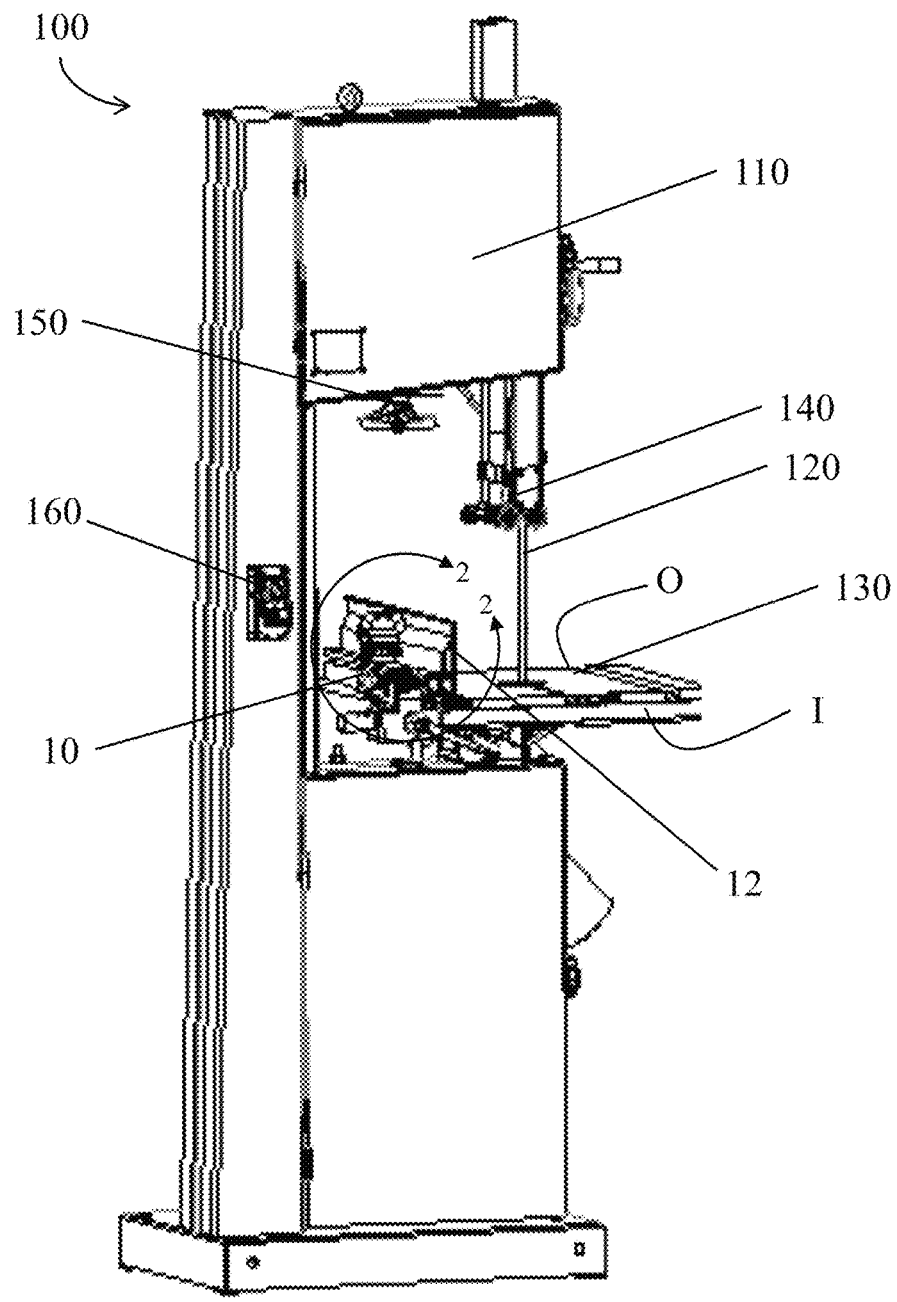
FIG. 1 is a perspective view of a bandsaw.

The inventors have recognized and appreciated that conventional band saw fence systems may be difficult and/or time consuming to adjust to correct or account for drift. For example, a drift correction may involve repeatedly performing test cuts and adjustments of the fence angle until the fence is properly positioned to achieve a straight line cut. However, typical fence systems do not allow for simple adjustment of the fence angle. For example a fence angle adjustment may involve adjusting one or more screws or bolts, or unclamping the fence from a table and manually adjusting the angle. Such adjustments may be complicated and/or time consuming, and may require the use of one or more tools. In view of the above, the inventors have recognized numerous benefits associated with providing a fence system for a band saw which affords simple and fast adjustment of the angle of the fence to correct for blade drift, including fine-adjustment.

In some embodiments, a fence system includes a fence positioned to guide and/or align a work piece during a cutting process, and a fence adjustment system constructed and arranged to allow an operator to adjust the position and/or orientation of the fence relative to a saw blade. During a cutting process, a work piece may be pressed against the fence while it is fed through the saw blade. In this manner, a fence may provide support for the work piece and may guide the work piece to allow an operator to perform a straight line cut, and the lateral position of the fence relative to the blade may control the thickness of the cut. A fence adjustment system may include one or more locks to selectively lock the fence in a desired position and/or orientation after adjustment.

According to one aspect of the present disclosure, a fence adjustment system may include a drift adjustment mechanism that allows an operator to quickly and easily adjust the angle of a fence relative to the blade to correct for blade drift. In some embodiments, a fence is attached to a fence adjustment system at an attachment point, and a drift adjustment mechanism is spaced from the attachment point. The drift adjustment mechanism may apply a displacement to a portion of the fence, thereby causing the fence to pivot or rotate about the attachment point to adjust the angle of the fence relative to the blade on a band saw. In this manner, the attachment point may act as a fulcrum during a drift angle adjustment. In some embodiments, the fence attachment point of a fence adjustment system is disposed on the infeed side of the band saw, and the drift adjustment mechanism is disposed on the fence adjustment system at a position displaced toward the outfeed side of the band saw relative to the attachment point. Without wishing to be bound by theory, such a configuration may allow an operator to adjust the angle of the fence while maintaining the lateral position of the fence, and therefore an operator need not readjust the lateral position after performing a drift angle adjustment. However, other configurations for the drift adjustment system and attachment point are also contemplated, as the current disclosure is not so limited. Depending on the particular embodiment, a drift adjustment system also may include a lock to selectively lock the drift adjustment system in place in place at a desired position corresponding to a desired fence angle.

In some embodiments, an attachment arrangement of a fence to a fence adjustment system may not provide substantial support and/or may include some degree of slack or play. For example, a drift adjustment mechanism as described above may simply rely on surface contact between the fence and the adjustment mechanism. Additionally, attachment of the fence to an attachment point on the fence adjustment system may be loose or otherwise allow some degree of movement of the fence relative to the fence adjustment system. Moreover, in some instances, an attachment arrangement may need to be loosened to allow for a drift angle adjustment. The inventors have recognized that an attachment arrangement that otherwise creates or includes such play or slack may be disadvantageous as it may lead to inaccurate, difficult, complex, and/or more time consuming adjustment. Accordingly, the inventors have recognized that a fence adjustment system include a biasing element may provide for a more stable attachment arrangement during adjustment, which may afford simpler and quicker adjustment of the drift angle. For example a biasing element may be configured to provide a positive engagement between a fence and the fence adjustment system during an adjustment. Such a configuration may provide for smooth and/or precise adjustment of the drift angle. The positive engagement provided by a biasing element may help to hold a fence in toward the fence adjustment system and may reduce slack or play in the fence and/or fence adjustment system during an adjustment. Further, a biasing element may provide a resistance force during positioning which may aid with a drift angle adjustment. For example, a resistance force may be sufficient to smooth out or limit undesirable small movements of a fence during adjustment and therefore allow an operator to consistently and precisely adjust a fence to a desired angle.

For the sake of clarity, the presently disclosed embodiments are directed to fences and fence adjustment systems for band saws. However, the present disclosure is not limited to band saws. Instead the fence adjustment systems could be used with table saws, radial arm saws, chop saws, drill presses, routers and router tables, or any other suitable cutting and/or machining systems. Moreover, the fence adjustment system is not limited to use on cutting or machining systems for wood. Rather, the fence adjustment system may be used with laser cutting systems, water jet cutting systems, or any other cutting system that utilizes a table and a fence to cut any suitable material. Further, it should be understood that the fences and fence adjustment systems described herein may be integrally built into a cutting and/or machining system, or alternatively, they may mounted on existing systems as a retrofit parts.

Turning now to the figures, specific non-limiting embodiments of fence systems are described in further detail. While specific embodiments are described below, it should be understood that the various components, systems, and methods of operation described herein may be combined in any suitable fashion as the current disclosure is not so limited.

FIG. 1 depicts one embodiment of a band saw 100 in which a fence system as described herein may be used. The band saw includes including a saw housing 110, a continuous saw blade 120, a work table 130, at least one blade guide assembly 140, a blade tensioner 150, and a switch 160. In a cutting process, an operator may feed a work piece through the band saw from the infeed side I, and cut pieces may be retrieved from the outfeed side O. A fence system 10 is disposed adjacent to the table 130 such that the fence 12 supports and/or guides the work piece during the cutting process.

Figure 2:
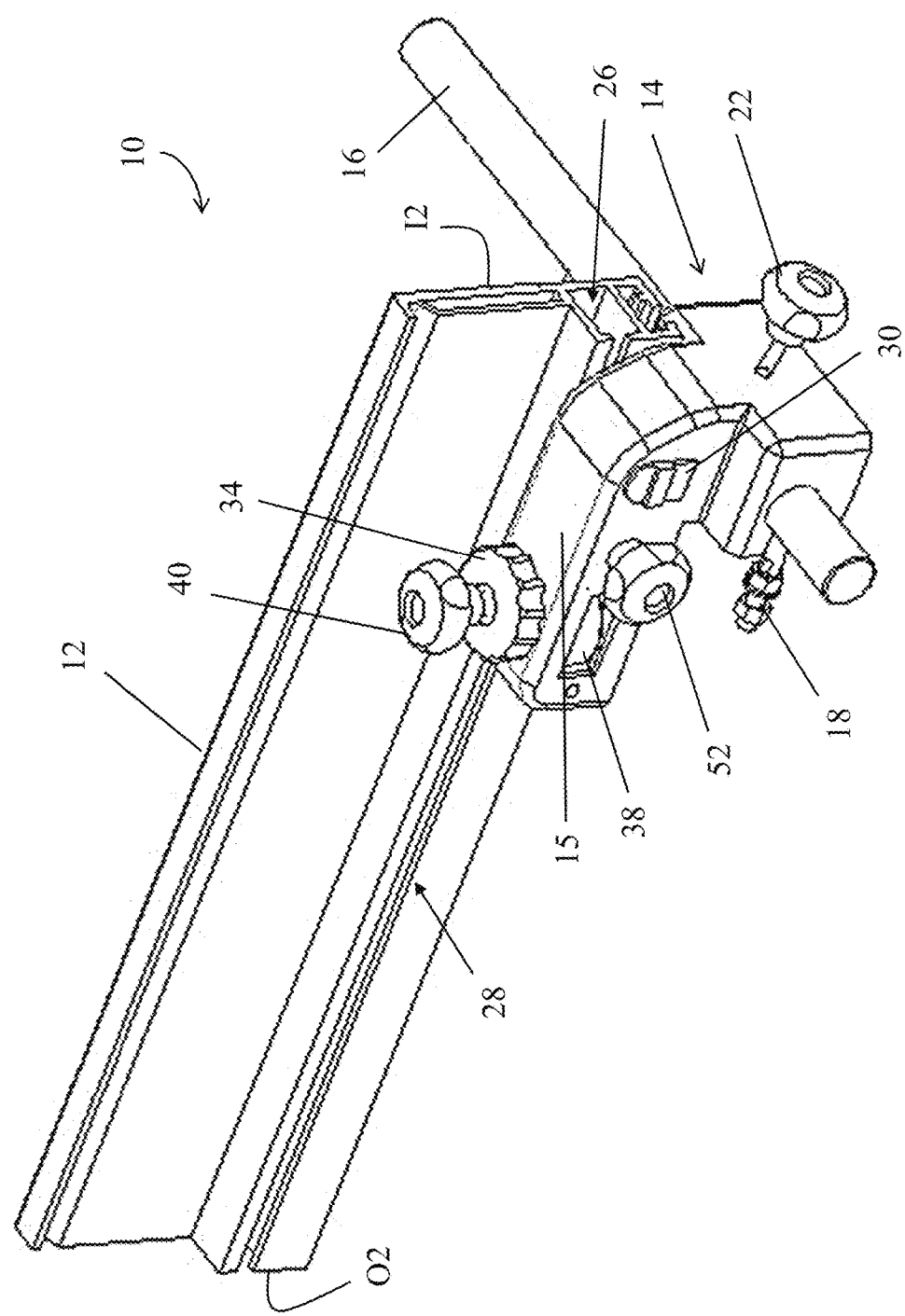
FIG. 2 is a perspective view of one embodiment of fence system encircled by line 2-2 of FIG. 1.
Figure 3:
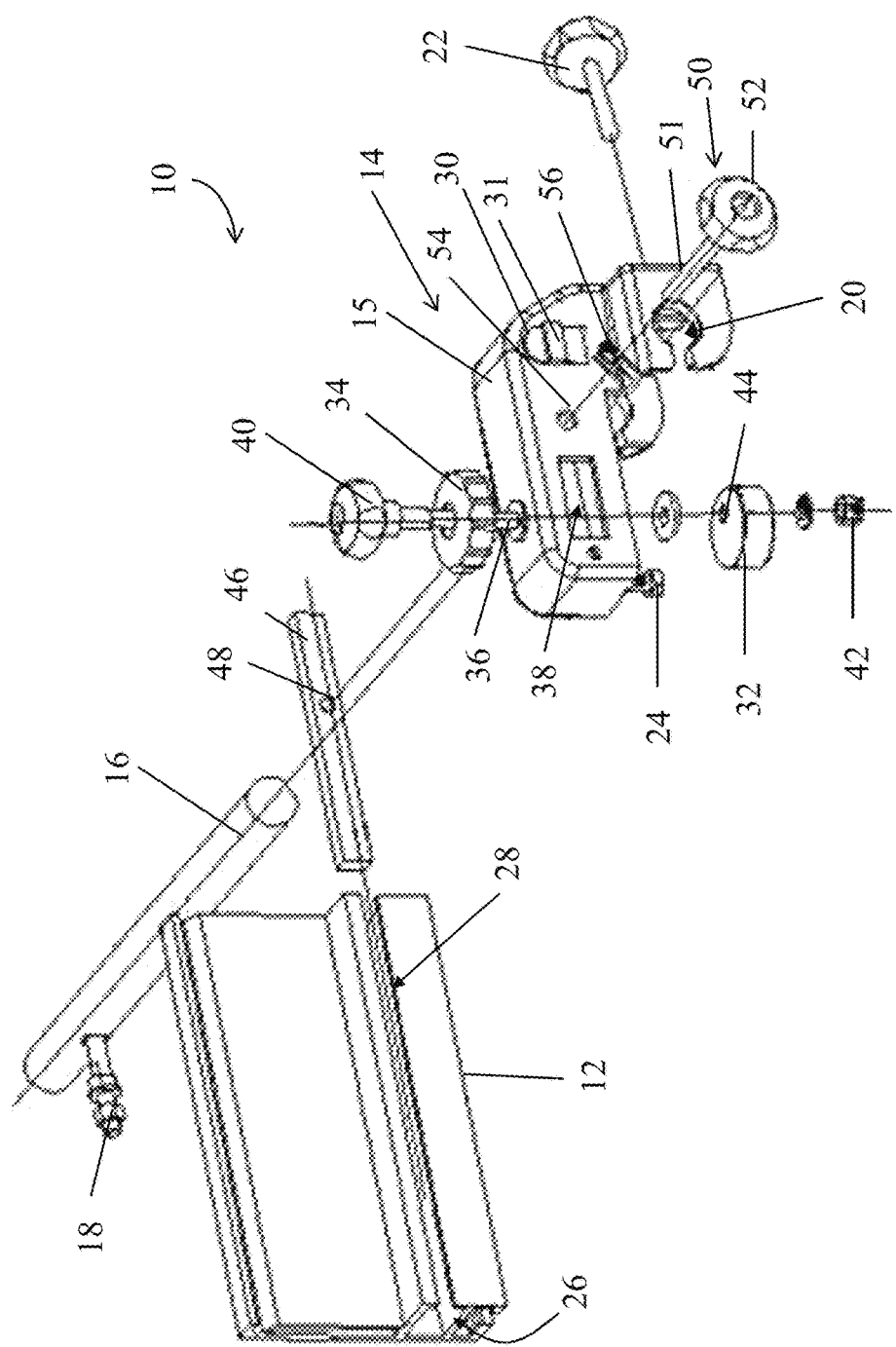
FIG. 3 is an exploded view of the fence system of FIG. 2.

FIGS. 2 and 3 depict one embodiment of a fence system 10 including a fence 12 and a fence adjustment system 14. The fence has an infeed side 12 and an outfeed side O2 corresponding to the infeed side I and outfeed side O of the bandsaw, respectively, as depicted in FIG. 1. The fence adjustment system is mounted on a rail 16 which may be attached to a band saw via one or more fasteners 18. Depending on the particular embodiment, the fence adjustment system 14 may be movable along the rail to allow for lateral positioning of the fence 12 relative to a band saw blade. In the depicted embodiment, the fence adjustment system includes through holes 20 configured to receive the rail 16 and to allow sliding of the fence adjustment system along the rail. A first locking handle 22 selectively retains the fence adjustment system at a desired location along the rail, corresponding to a desired spacing of the fence relative to a blade. A leveling screw 24 contacts the table of a band saw and is adjustable to ensure that the fence sits flat on the table; typically the leveling screw is only adjusted during the initial installation of the fence system onto a band saw, or when an operator installs a different fence on the fence system.

The fence 12 includes at least one channel 26, and the channel has an open slot 28 along the length of the fence. The fence adjustment system includes two slide blocks 30 disposed on opposing sides of the fence adjustment system housing 15; the slide blocks include a boss 31 configured to be received in the slot 28. As best illustrated by FIG. 2, the boss of the second slide block (not depicted but identically shaped as the first slide block) is received in the slot 28. It should be understood that the engagement between a slide block and the slot on the fence may be loose enough to allow at least some motion of the fence relative to the fence adjustment system. As described in more detail below, when coupled to the slide block, the fence may both slide along a longitudinal direction of the fence relative to the fence adjustment system, and the slide block may act as a fulcrum such that the fence can pivot or rotate about an axis perpendicular to a plane defined by a band saw table. Though two slide blocks are shown and described, only one is being employed. In this respect, the housing 15 itself may act as the fulcrum. Also, it should be appreciated that the slide block 30, if employed, may be a separate component attached to the housing 15 or may be integrally formed with the housing.

As best illustrated by FIG. 3, the fence adjustment system includes a drift adjustment mechanism including a cam 32 coupled to a knurled adjustment knob 34 via an axle 36. The cam is received in a channel 38 in the housing 15, and a portion of the cam may extend from the channel on either side of the housing 15. One end of the axle 36 is attached to a second locking handle 40, and the other end is connected to a locking nut 42. Further, the cam 32 includes a through hole 44 that is off-center relative to the adjustment knob 34, such that rotation of the adjustment knob causes a variation in the distance that the cam extends from the channel 38. When a portion of the fence is adjacent to the channel and cam, as depicted in FIG. 2, rotation of the adjustment knob causes the cam to impart a variable displacement to that portion of the fence (e.g., the cam pushes on the fence or allows the fence to move toward the cam), thereby causing the fence to pivot or rotate about at a fulcrum defined by the slide block 30. In this manner, the angle of the fence may be adjusted by simply turning the adjustment knob 34. Moreover, when the second locking handle 40 is tightened, a clamping force between the adjustment knob and the fence adjustment system may be sufficient to lock the drift adjustment mechanism in a desired position.

Referring again to FIG. 3, the fence 12 is secured to the fence adjustment system 14 via a clamping engagement between a block 46 and the fence adjustment system. Specifically, a retaining block 46 is received in channel 26 of the fence 12 and includes a threaded hole 48 configured to receive a correspondingly threaded locking bolt 50, which is in turn attached to a third locking handle 52. The shaft 51 of locking bolt 50 is received by a through hole 54 in the housing 15 and through the channel 28 in the fence before being received by threaded hole 48 in the retaining block 46. Tightening of the locking bolt 50 via grasping the third locking handle 52 may apply a clamping force to the fence between the retaining block and the housing 15; this clamping force may be sufficient to substantially limit displacement and/or rotation of the fence relative to the fence adjustment system. In contrast, when the third locking handle is in an unlocked or loosened configuration, the fence may be free to slide and/or rotate, as described above.

In the depicted embodiment, a biasing element in the form of a coil spring 56 is provided on the shaft 51 of the locking bolt 50 between the housing 15 and the third locking handle 52. The biasing element is arranged to provide a positive engagement between the fence 12 and the fence adjustment system 14, even when the third locking handle 52 is in an unlocked or loosened configuration. For example, the biasing element may urge the third locking handle and therefore the shaft 51 away from the housing, and in a direction away from the fence, thereby pulling the restraining block 46 via the attached shaft towards the housing 15 of the fence adjustment system 14. The biasing force provided by the biasing element may be sufficient to remove any play from the adjustment of the fence angle when the third locking handle is in an unlocked or loosened configuration by providing a small clamping force between the retaining block and the fence adjustment system. The biasing force may also aid in maintaining positive engagement between the fence 12 and the cam 32 to allow for the displacement of the fence to decrease as the extension of the cam from the channel 38 decreases.

In some embodiments, a fence adjustment system 14 includes identical features disposed on opposing sides of the housing 15 to allow for the fence 12 to be positioned on either side of a blade. For example, in the depicted embodiment, the slide blocks 30 and bosses 31 are identically positioned on opposing sides of the housing. Therefore an operator may reposition the fence by completely unlocking and removing locking bolt 50 from through hole 54, and disengaging the boss 31 from slot 28 in the fence. The fence may subsequently be rotated such that the original outfeed side of the fence O2 is positioned on the infeed side of the band saw, and reattached to the opposite side of the fence adjustment system 14 by reengaging the slot 28 with boss 31 on slide block 30. The locking bolt 50 may then be received through the through hole 54 from the opposing side of the housing 15 to secure the fence to the fence adjustment system, as described above.

Figure 4:
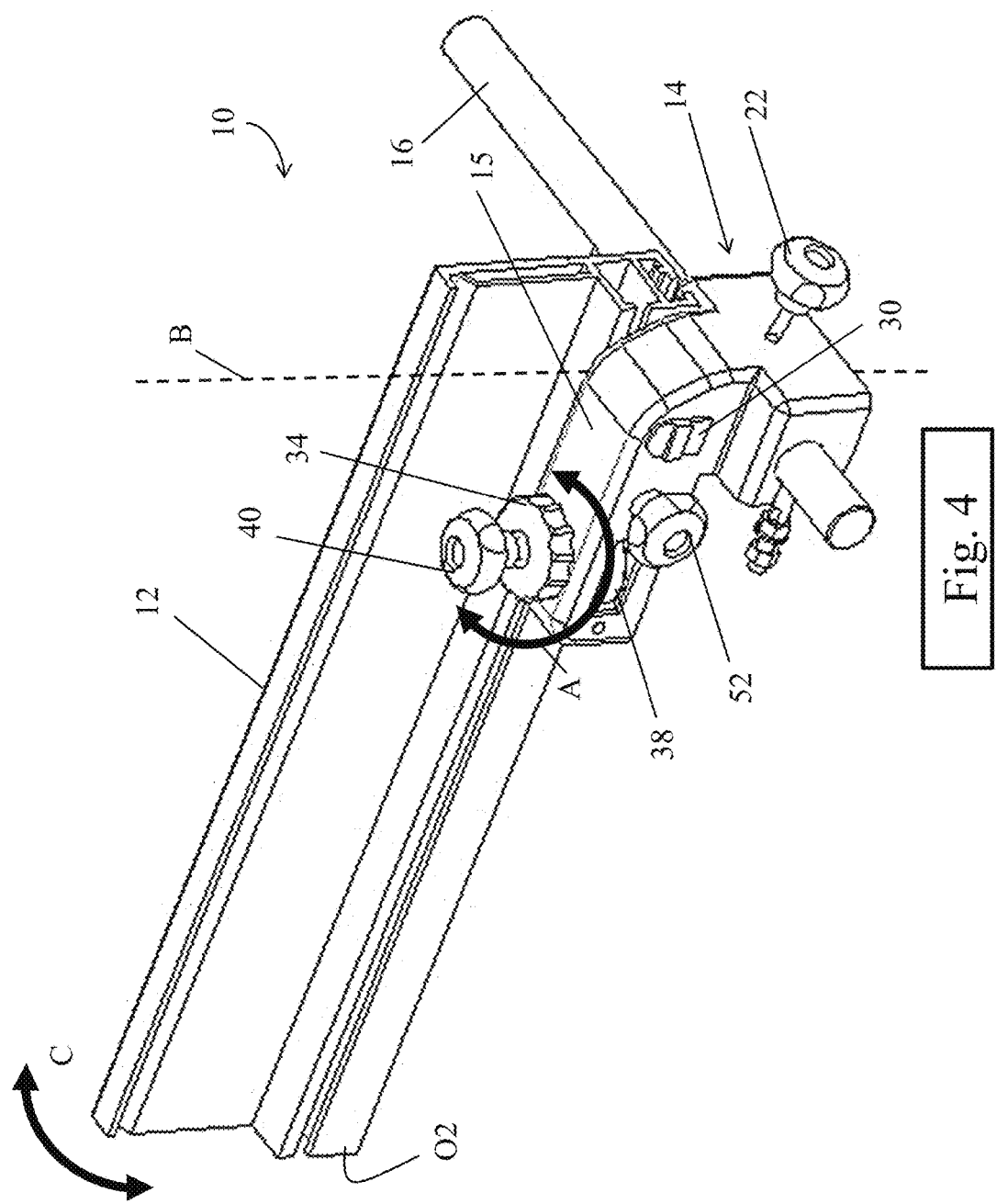
FIG. 4 depicts the fence system of FIG. 2 during adjustment.

Having described various components of a fence system, its method of use is described in more detail with reference to FIG. 4. If lateral adjustment of the fence 12 is desired, the first locking handle 22 may be loosened to permit sliding of the fence adjustment system 14 along rail 16. When the fence is adjusted to a desired lateral position, the first locking handle 22 is subsequently tightened to limit further lateral displacement of the fence. Further adjustment may be performed after loosening and/or unlocking the second locking handle 40 and third locking handle 52. If desired, the fence may be slid along its length to either increase or decrease the extent to which the fence extends from the infeed side of the band saw.

A drift angle adjustment may be performed to correct for blade drift. Knob 34 is rotated according to direction A such that the cam displaces a portion of the fence 12 adjacent to the channel 38. This displacement results in rotation of the fence about axis B that is generally perpendicular to the table of the band saw and passes through the fulcrum defined by the slide block 30. Rotation of the fence causes the outfeed side of the fence O2 to move according to direction C, thereby changing the angle of the fence. As described above, a biasing element applies a small clamping force of the fence against the housing of the fence adjustment system during the drift angle adjustment to reduce play and provide for a precise adjustment. When the fence angle has been suitably adjusted, the position and/or orientation of the fence is subsequently locked in place by tightening locking handles 40 and 52. In view of the above, it should be understood that the fence system described herein may provide for simple, quick, tool-free, and precise adjustment of the position and/or orientation of a fence.

Depending on the particular embodiment, the range of adjustment for the fence angle may be determined or controlled by the spacing between the slide block 30 and the cam 32. For example, a larger distance may result in a smaller adjustment range. Similarly the maximum displacement of the cam may also define the maximum angular adjustment; a cam with a larger displacement profile may allow for larger displacements of the fence and therefore larger angular displacements. It should be understood that a fence adjustment system may have any suitable combination of spacing between the slide block and cam as well cam size to achieve any suitable angular adjustment range, as the present disclosure is not so limited.

While the adjustment knob is depicted as having a knurled configuration, other configurations are also contemplated. For example, the adjustment knob may be smooth, may have a winged configuration, or may have any other suitable configuration. Moreover, in some embodiments, the adjustment knob may be calibrated such that a particular angular rotation of the adjustment knob results in a predetermined angular adjustment for the fence. In such embodiment, the adjustment knob may include markings corresponding to particular angular adjustments.

Although a coil spring has been described for the biasing element, other biasing elements also may be suitable. For example, the biasing element may include, but is not limited to, a torsion spring, a leaf spring, a wave spring, a magazine spring, a gas spring, an elastic rod, an elastic band, or any other suitable structure capable of providing a biasing force to the fence during an adjustment, as the disclosure is not so limited.

While screw locking mechanisms have been described above, other locking mechanisms are also contemplated. For example, other configurations capable of applying a compressive force between various components of a fence adjustment system may be suitable, such as an over center latch, a spring latch, or a compression latch. Furthermore, although the embodiments describe herein include a tool free interface to loosen or unlock a locking mechanism, in some embodiments, some or all of the locking mechanisms may not be tool free. For example, a tool such as a wrench or a screwdriver may be required to achieve a suitable locking force.

Although a rotating cam has been described for applying a displacement to the fence during an angular adjustment, it should be understood that other configurations may be suitable, as the present disclosure is not so limited. For example, a linear actuator such as a push rod may be provided in a channel in a fence adjustment system to apply a displacement to a portion of a fence.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A fence adjustment system for use with a fence disposed on a work table for supporting a workpiece, the fence adjustment system comprising:
    a housing;
    a drift adjustment mechanism coupled to the housing and configured to displace a portion of a fence away from the housing, the fence being attached to the housing such that displacement of the portion of the fence by the drift adjustment mechanism causes the fence to rotate about a fulcrum, wherein the fulcrum is disposed on the housing on a side adjacent to the fence;
    a lock movable between a locked configuration and an unlocked configuration, wherein the lock limits displacement of the fence relative to the housing when the lock is in a locked configuration; and
    a biasing element arranged to cause the fence to maintain contact with the housing when the lock is in an unlocked configuration.

2. The fence adjustment system of claim 1, further comprising a slide block on the housing, wherein the fulcrum is defined by the slide block.

3. The fence adjustment system of claim 1, wherein the lock includes a threaded shaft and a knob, and the biasing element is a coil spring disposed on the shaft and abutting the knob.

4. The fence adjustment system of claim 3, wherein the shaft extends through a hole in the housing to engage the fence.

5. The fence adjustment system of claim 4, wherein the coil spring is disposed between the housing and the knob to push the knob away from the housing, and adapted to draw the fence toward the housing.

6. The fence adjustment system of claim 1, wherein the biasing element is associated with the lock.

7. The fence adjustment system of claim 1, wherein the drift adjustment mechanism includes a rotating cam.

8. The fence adjustment system of claim 1, wherein biasing element is at least one of a coil spring, a leaf spring a wave spring, a gas spring, an elastic rod, and an elastic band.

9. The fence adjustment system of claim 1, wherein the lock is at least one of a screw interface and a latch.

10. The fence adjustment system of claim 1, wherein the drift adjustment mechanism is a tool free drift adjustment mechanism.

11. The fence adjustment system of claim 1, wherein the lock comprises a tool free lock.

12. A fence adjustment system for use with a fence disposed on a work table for supporting a workpiece, the fence adjustment system comprising:
    a housing having a fulcrum, the housing configured to engage a first portion of a fence at the fulcrum;
    a cam configured to displace a second portion of the fence, wherein displacement of the second portion of the fence by the cam causes the fence to rotate about the fulcrum; and
    a lock movable between a locked configuration and an unlocked configuration, wherein the lock limits displacement of the fence when the lock is in a locked configuration;
    wherein, in a direction from an infeed side of the fence to an outfeed side of the fence, the fulcrum is positioned on the housing followed by the lock positioned in the housing, followed by the cam positioned in the housing.

13. The fence adjustment system of claim 12, further comprising a biasing element arranged to maintain contact between the fence and housing when the lock is in an unlocked configuration.

14. The fence adjustment system of claim 13, wherein the lock includes a threaded shaft and a knob, and the biasing element is a coil spring disposed on the shaft and abutting the knob.

15. The fence adjustment system of claim 14, wherein the shaft extends through a hole in the housing to engage the fence.

16. The fence adjustment system of claim 15, wherein the coil spring is disposed between the housing and the knob to push the knob away from the housing, and adapted to draw the fence toward the housing.

17. The fence adjustment system of claim 13, wherein the biasing element is associated with the lock.

18. The fence adjustment system of claim 13, wherein biasing element is at least one of a coil spring, a leaf spring a wave spring, a gas spring, an elastic rod, and an elastic band.

19. The fence adjustment system of claim 13, wherein the lock is at least one of a screw interface and a latch.

20. The fence adjustment system of claim 12, wherein the fulcrum is disposed on the housing on a side adjacent to the fence.

21. The fence adjustment system of claim 20, further comprising a slide block on the housing, wherein the fulcrum is defined by the slide block.

* * * * *